United States Patent [19]

Meyer

[11] 4,092,766
[45] June 6, 1978

[54] RETAINER CLIPS

[75] Inventor: Engelbert A. Meyer, Union Lake, Mich.

[73] Assignee: USM Corporation, Farmington, Conn.

[21] Appl. No.: 596,815

[22] Filed: Jul. 17, 1975

Related U.S. Application Data

[63] Continuation of Ser. No. 492,680, Jul. 29, 1974, abandoned.

[51] Int. Cl.² ............................................. A44B 21/00
[52] U.S. Cl. .................................. 24/73 MF; 24/73 B
[58] Field of Search ................. 24/73 B, 81 B, 73 MF

[56] References Cited

U.S. PATENT DOCUMENTS

| 2,689,027 | 9/1954 | Flora ..................................... 24/73 B |
| 2,911,693 | 11/1959 | McMullen ............................ 24/73 B |

FOREIGN PATENT DOCUMENTS

| 561,524 | 8/1958 | Canada .................................. 24/73 B |

Primary Examiner—Werner H. Schroeder
Assistant Examiner—Peter Nerbun
Attorney, Agent, or Firm—Aubrey C. Brine; Richard B. Megley; Vincent A. White

[57] ABSTRACT

A transversely resilient one-piece sheet metal clip, generally U-shaped is formed for detachable push-on mounting and suspension from one inner side of an elongated channel member such as a molding which is to longitudinal receive and anchor therein a workpiece or pieces. For instance, the channel may be a roof drip molding for an automobile and required, by means of a plurality of these clip structures, when suitably spaced, to retain therein the edges of sheet metal and/or other sheet lining material such as vinyl or the like. The clip has its longer leg transversely bowed and formed with at least one barb or tang portion and one suspension portion cooperative to grip the molding side on opposite faces thereof, the shorter leg of the clip being formed with at least one tang projecting for gripping engagement with the lining material or body sheet metal commonly known as the pinch weld.

6 Claims, 5 Drawing Figures

RETAINER CLIPS

This is a continuation, of application Ser. No. 492,680 filed July 29, 1974, now abandoned.

BACKGROUND OF THE INVENTION

This invention relates to fasteners, and more particularly to resilient clips made from sheet metal and adapted to be easily applied to hold parts in assembled relation.

U-shaped resilient clips of different shapes and sizes are known and employed in large quantities in many different types of assembly.

While there may well be other usages for the present invention, a common application therefor having particular advantages from the standpoints of economy, convenience, and neatness of appearance arises in the vehicle industry. By way of illustration only, the invention is accordingly herein disclosed as employed in the assembly of a strip of roof drip molding to the margins of sheet material, for instance of a sheet metal roof and its overlying vinyl covering. It will be appreciated that the clip or fastener means of this invention is not thus limited in use.

SUMMARY OF THE INVENTION

In addition to the customary reliability factor, an attractive appearance, unobtrusiveness, or at least causing no detraction from ornamental aspects may also be a desirable attribute along with economy of clip manufacture and greater facility in application. It is therefore an object of the present invention to provide a novel clip enabling possibly unattractive portions of work such as margins of sheet material to be secured within a channel member such as a decorative U-shaped molding strip. As herein shown a small tab of the clip is employed to detachably suspend the clip from a non-exposed side of the strip, an arched body of the clip having oppositely projecting barbs resiliently biased to engage and hold the sheet margins within the molding strip. The arrangement is such that, having assembled by push-on action the clip (or clips) to the molding side, the workpiece margins are thrust edgewise into the molding channel, and in so doing the clip or clips transversely yield to allow inward passage of the work margins as other tangs of the clips are thus forced to grip an inner face of the molding. Withdrawal of the margins from the molding is then prevented by the tangs unless the clips are detached.

BRIEF DESCRIPTION OF THE DRAWINGS

The foregoing and other features of the invention together with novel details in construction will now be more particularly described in connection with an illustrative embodiment and with reference to the accompanying drawings thereof, in which.

DESCRIPTION OF PREFERRED EMBODIMENT

Figure 1:
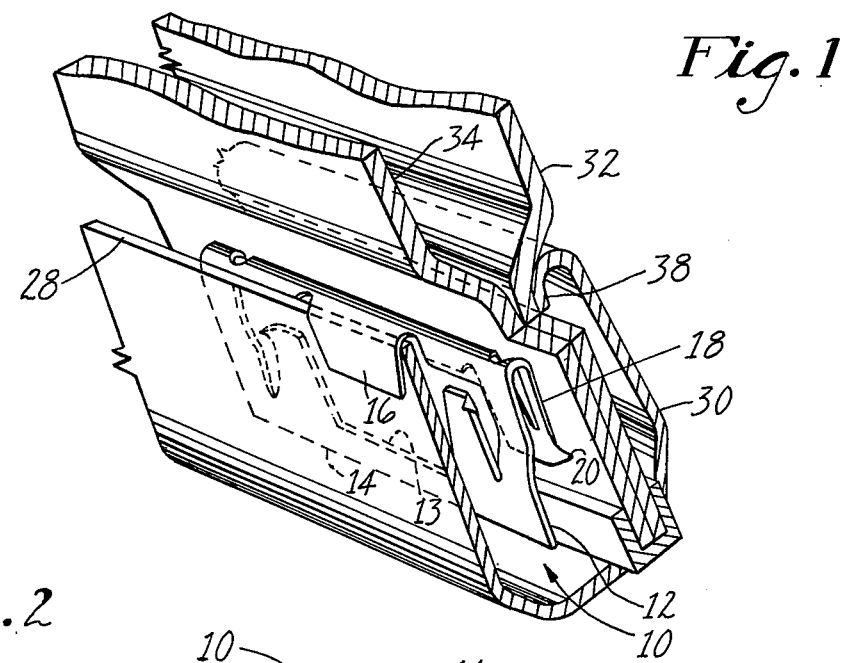
FIG. 1 is a perspective view showing my novel clip mounted for securing, within a portion of a roof molding strip, the margins of sheet material, for instance exterior vinyl roof covering on a vehicle roof panel and inner rail.
Figure 2:
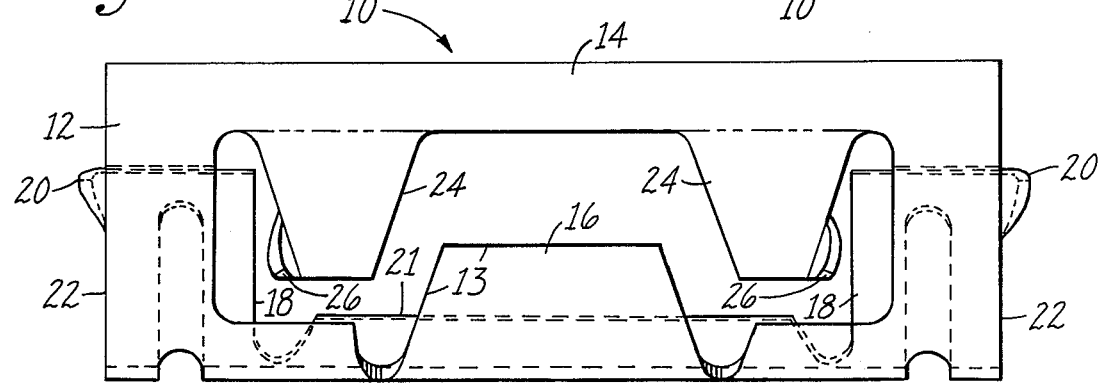
FIG. 2 is a view in side elevation showing the clip seen in FIG. 1 but inverted.
Figure 3:
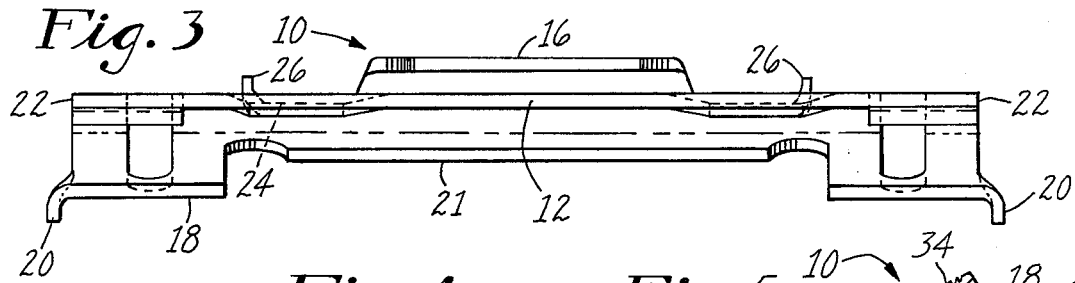
FIG. 3 is a view of the clip shown in FIG. 2 but turned 90 degrees about a horizontal axis.
Figure 4:
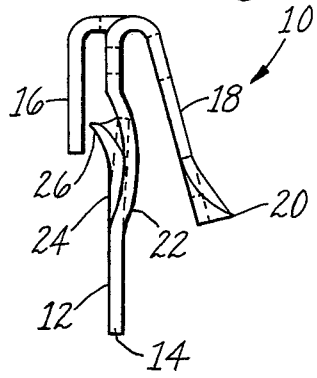
FIG. 4 is a view in end elevation of the clip when unstressed.

A more or less U-shaped sheet metal clip generally designated 10 is elongated and preferably substantially symmetric with respect to a mid portion. The clip is formed with a main, largely planar and rectangular body portion 12 formed with a cut-out area 13 and a border 14, and provided with a central, transversely resilient suspension tab 16 on one side thereof. On the opposite side from the tab 16, extending in U-bend manner away from the portion 12, a pair of spaced, preferably slotted, resilient legs 18,18 respectively carry at their outer extremities integral work engageable tangs or prongs 20,20 for gripping workpieces as hereinafter to be explained. A work engageable portion 21 extends between the legs 18 and in their plane.

The body portion 12 has outboard legs 22,22 which are slightly arched or bowed transversely toward the confronting legs 18, respectively.

Figure 5:
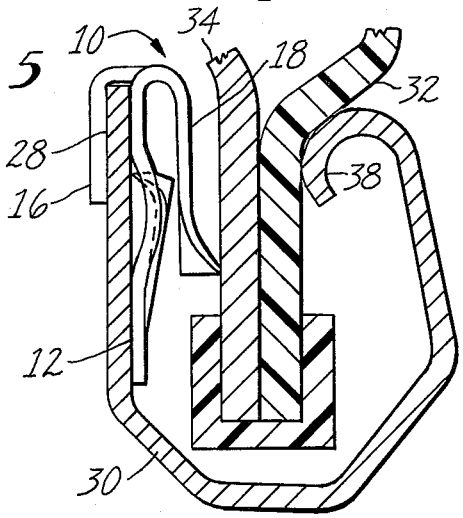
FIG. 5 is a view corresponding to FIG. 4 but with the clip assembled in gripping relation to the work pieces.

Inboard spaced legs 24,24 upstanding from the border 14 also have tangs 26,26 respectively which project in a direction opposite to that of the tangs 20 and are disposed, when unstressed, in a line substantially parallel with, and nearly in the same plane as, the free end of the suspension tab 16. The arrangement is such that the straight, leading edge 28 of a channel member, for instance a roof drip molding 30 (FIG. 1 and 5) can be thrust under the lip of the free end of the tab 16, as permitted by the concavity in the legs 22,22 and then, against yielding resistance to deflection of the tab 16, urged relatively past the biting and gripping engagement of the tangs 26,26 until the molding edge 28 is fully received and secured in the bight of the tab 16. It will be understood that the tab 16 will not show in the completed assembly of the molding 30 with a vehicle since the edge 28 will be on a non-exposed side of the molding. The clip 10 is accordingly adapted for push-on mounting and may be readily detached, if necessary, from the molding.

With one or more clips 10 mounted in spaced arrangement along the edge 28, margins of workpieces such as those of a vinyl roof covering sheet 32 (FIGS. 1 and 5) and of a metal roof panel 34 and inner rail (if any, none shown) may be thrust into the molding 30 between its inturned lip 38 and the confronting clip legs 18. The vinyl 32 engages and transversely depresses the resilient legs 18, their tangs 20 being angularly biased to permit reception of the work margins but exerting high resistance to any attempted withdrawal of them from the channel bottom of the molding.

Having thus described my invention, what I claim as new and desire to secure as Letters Patent of the United States is:

1. A sheet metal clip adapted for assembly on one flange of a U-shaped channel member for securing the margin of one or more workpieces in the space between the flanges of the channel member, the clip comprising:
    an elongated body portion having along its upper edge a bight,
    from which there downwardly extends on one side a transversely resilient suspension tab,
    and downwardly on the opposite side there extends at least a pair of spaced resilient legs angularly related to the body portion and extending outwardly therefrom when unconfined, a pair of prongs, located one on each side of said tab and projecting from said body portion toward said tab to define a space between said tab and said prongs for receiving the one flange of the channel in gripping engagement therebetween, each of said legs being biased toward the opposite flange of said channel from said one flange when said clip is mounted on said channel, and extending from said body portion toward the opposite flange to define a space therebetween for receiving the one or more workpieces in gripping engagement therebetween, and a prong disposed on each of said legs directed inwardly of said channel to retain the one or more workpieces in the so defined space in the channel.

2. A clip as in claim 1 wherein the legs and prongs are symmetrically arranged with respect to a mid portion of said suspension tab.

3. A clip as in claim 2 wherein said body portion is substantially disposed in a plane extending approximately midway between planes respectively containing the suspension tab and said pair of resilient legs.

4. In combination with a U-shaped channel member having a pair of upstanding flanges between which outer margins of one or more workpieces is to be secured, a sheet metal clip comprising:

an elongated body portion having along its upper edge a bight, from which there extends on one side a transversely resilient suspension tab extending downwardly on the outside of one of said channel flanges, and on the other side of said bight at least a pair of spaced resilient legs angularly related to the body portion and extending downwardly and outwardly therefrom toward the opposite flange of the channel when unconfined, a pair of prongs, located one on each side of said tab and directed upwardly and toward said tab and spaced from said tab for receiving said one flange in gripping engagement between said prongs and said tab, said legs being biased toward the opposite flange of said channel and extending toward said opposite flange to define a normal distance therebetween of lesser magnitude than the thickness of one or more workpieces to be received therebetween, and a prong disposed on each of said legs directed downwardly and toward said opposite flange to retain the one or more workpieces within the channel member.

5. A clip as in claim 4 wherein the legs and prongs are symmetrically arranged with respect to a mid portion of said suspension tab.

6. A clip as in claim 5 wherein said body portion is substantially disposed in a plane extending approximately midway between planes respectively containing the suspension tab and said pair of resilient legs.

* * * * *